US012705482B2

(12) United States Patent
Takimoto et al.

(10) Patent No.: US 12,705,482 B2
(45) Date of Patent: Aug. 11, 2026

(54) POINT PROCESS LEARNING METHOD, POINT PROCESS LEARNING APPARATUS AND PROGRAM

(71) Applicant: NTT, Inc., Tokyo (JP)

(72) Inventors: Yoshiaki Takimoto, Tokyo (JP); Takeshi Kurashima, Tokyo (JP); Yusuke Tanaka, Tokyo (JP)

(73) Assignee: NTT, Inc., Tokyo (JP)

( * ) Notice: Subject to any disclaimer, the term of this patent is extended or adjusted under 35 U.S.C. 154(b) by 663 days.

(21) Appl. No.: 18/249,772

(22) PCT Filed: Dec. 3, 2020

(86) PCT No.: PCT/JP2020/045033

§ 371 (c)(1),
(2) Date: Apr. 20, 2023

(87) PCT Pub. No.: WO2022/118429

PCT Pub. Date: Jun. 9, 2022

(65) Prior Publication Data

US 2023/0385638 A1 Nov. 30, 2023

(51) Int. Cl.
*G06N 3/08* (2023.01)

(52) U.S. Cl.
CPC .................................... *G06N 3/08* (2013.01)

(58) Field of Classification Search
CPC ........ G06N 3/08; G06N 3/0464; G06N 3/044; G06N 3/045
See application file for complete search history.

(56) References Cited

U.S. PATENT DOCUMENTS

| | | | | |
|---|---|---|---|---|
| 8,635,174 | B2 * | 1/2014 | Kobayashi | G06N 3/126 |
| 10,896,371 | B2 * | 1/2021 | Sun | G06N 3/08 |
| 2019/0147343 | A1 * | 5/2019 | Lev | G06N 3/088 |
| 2019/0369963 | A1 * | 12/2019 | Utsumi | G06Q 50/06 |
| 2020/0160176 | A1 * | 5/2020 | Mehrasa | G06N 3/08 |
| 2020/0193325 | A1 * | 6/2020 | Natsumeda | G06N 20/00 |
| 2020/0293527 | A1 * | 9/2020 | Srivastav | G06N 5/022 |
| 2020/0314117 | A1 * | 10/2020 | Nguyen | G06F 21/554 |
| 2022/0215412 | A1 * | 7/2022 | Horiguchi | G06Q 30/0202 |

OTHER PUBLICATIONS

Mei et al., "The neural hawkes process: A neurally self-modulating multivariate point process." (Year: 2017).*

(Continued)

*Primary Examiner* — Ryan Barrett
*Assistant Examiner* — Matiyas T Maru
(74) *Attorney, Agent, or Firm* — IPUSA, PLLC

(57) ABSTRACT

According to an embodiment, a point process learning method executed by a computer includes: an input procedure of inputting a learning data set including at least first event data representing a series of occurrences of first events; a division procedure of dividing the first event data included in the learning data set by using a prediction time observation area including at least a time series when predicting future event occurrence; and a learning procedure of learning a model parameter including a parameter of an intensity function of a predetermined point process model by using a divided learning data set divided in the division procedure.

11 Claims, 7 Drawing Sheets

(56) References Cited

OTHER PUBLICATIONS

Wu, et al., "Modeling event propagation via graph biased temporal point process." (Year: 2020).*
Harrison Edwards et al., "Towards a neural statistician", arXiv preprint arXiv:1606.02185, Mar. 20, 2017.
Nan Du et al., "Recurrent marked temporal point processes: Embedding event history to vector.", Proceedings of the 22nd ACM SIGKDD International Conference on Knowledge Discovery and Data Mining, 2016.
Yoshiko Ogata, "On Lewis' simulation method for point processes", IEEE Transactions on Information Theory 27(1), 2331, Jan. 1981.

* cited by examiner

Figure 2:
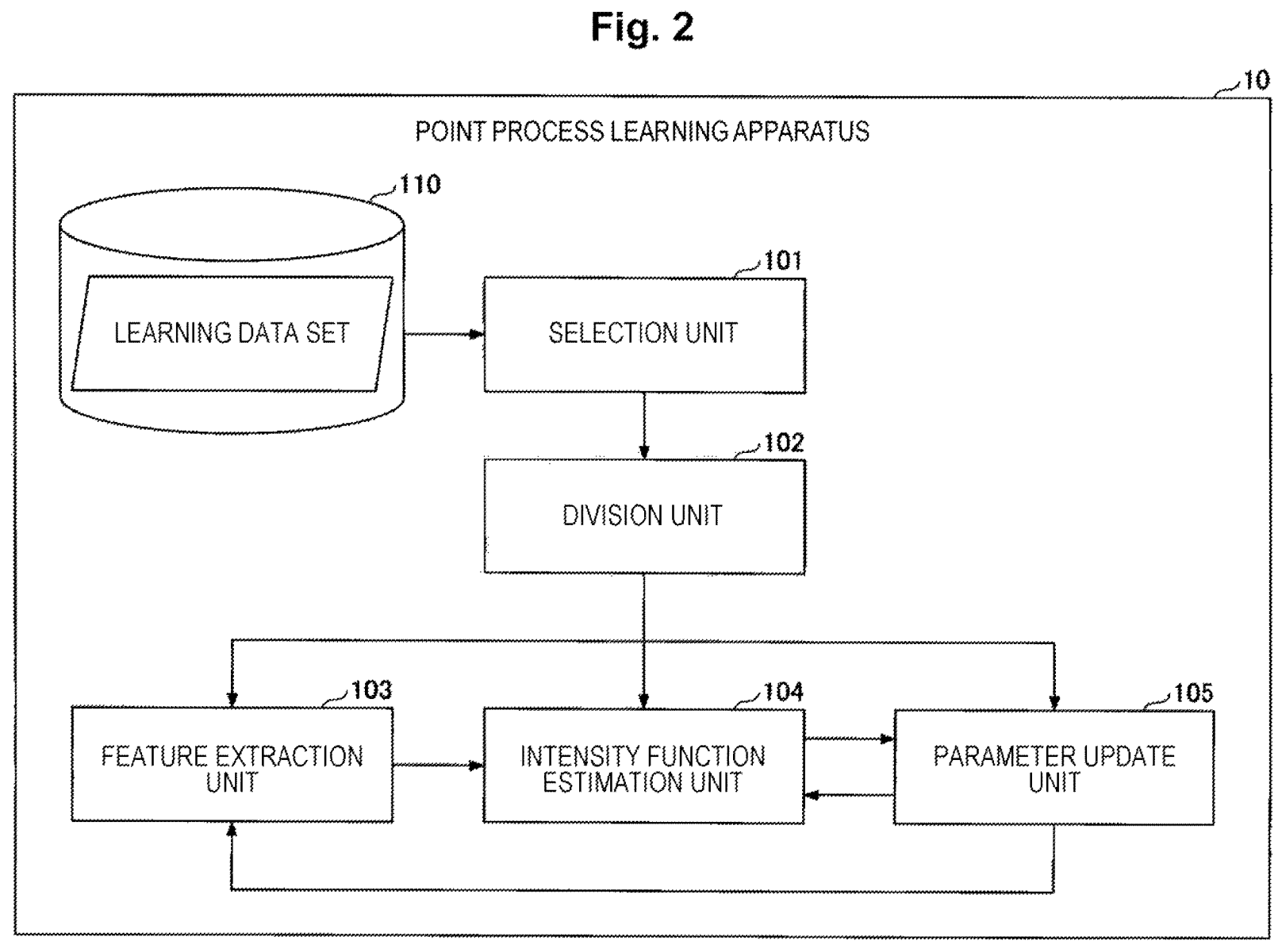

POINT PROCESS LEARNING APPARATUS

110 LEARNING DATA SET

101 SELECTION UNIT

102 DIVISION UNIT

103 FEATURE EXTRACTION UNIT

104 INTENSITY FUNCTION ESTIMATION UNIT

105 PARAMETER UPDATE UNIT

Figure 5:
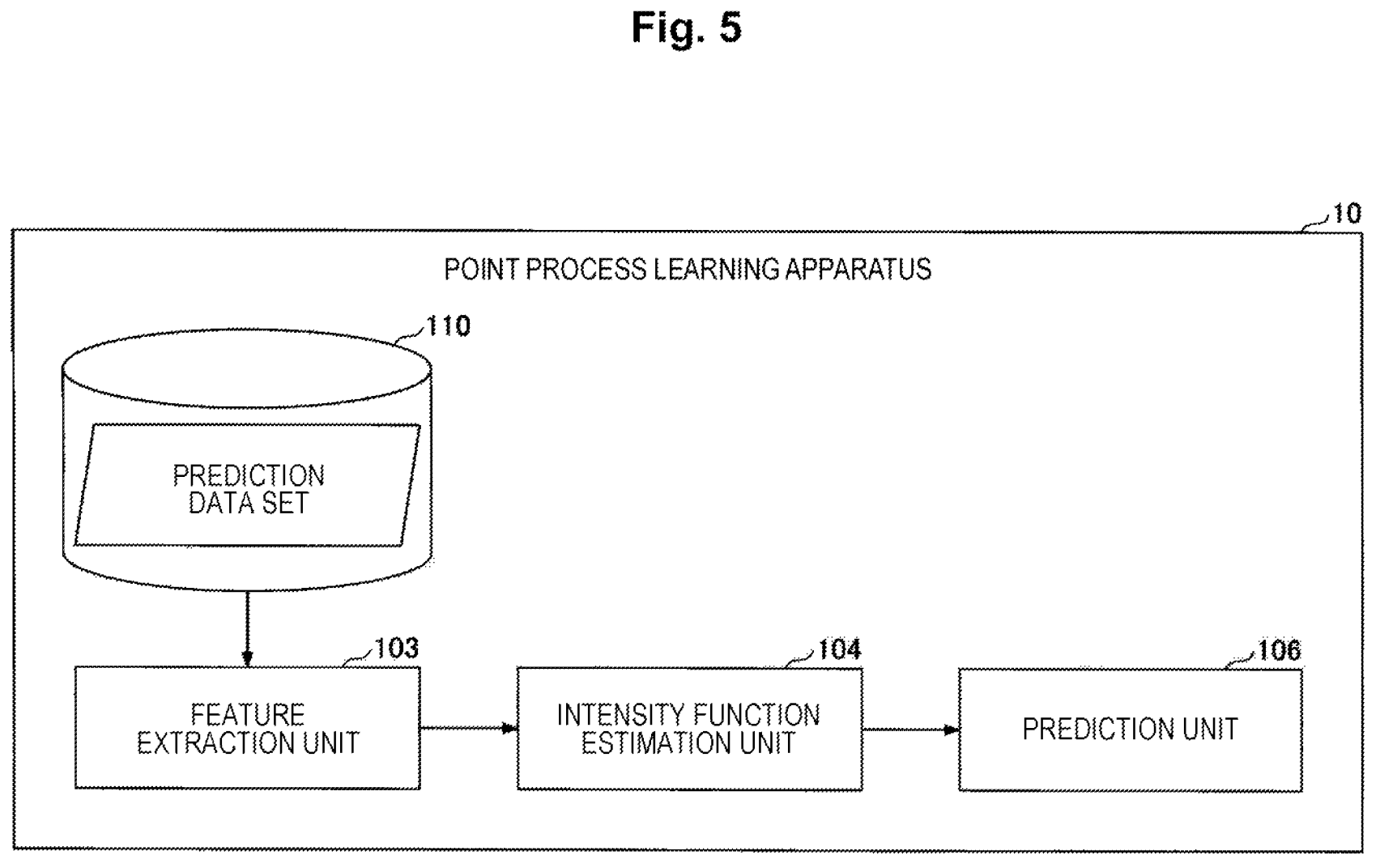

POINT PROCESS LEARNING APPARATUS

110

PREDICTION DATA SET

103

FEATURE EXTRACTION UNIT

104

INTENSITY FUNCTION ESTIMATION UNIT

106

PREDICTION UNIT

POINT PROCESS LEARNING METHOD, POINT PROCESS LEARNING APPARATUS AND PROGRAM

TECHNICAL FIELD

The present invention relates to a point process learning method, a point process learning apparatus, and a program.

BACKGROUND ART

Predicting the occurrence of future events is important in various applications, and a model called a point process has been often used conventionally. Note that the events are certain phenomena, and examples thereof include device failures, behaviors of human, crimes, earthquakes, infectious diseases, and the like.

CITATION LIST

Non Patent Literature

Non Patent Literature 1: Edwards, Harrison, and Amos Storkey. "Towards a neural statistician." arXiv preprint arXiv:1606.02185 (2016).

Non Patent Literature 2: Du, Nan, et al. "Recurrent marked temporal point processes: Embedding event history to vector." Proceedings of the 22nd ACM SIGKDD International Conference on Knowledge Discovery and Data Mining. 2016

SUMMARY OF INVENTION

Technical Problem

Although many pieces of event data (i.e., event data representing a history of events that occurred in the past) and prior knowledge are required in order to predict the occurrence of future events by a point process, it may be difficult in reality to prepare these. For example, it is difficult to prepare many pieces of event data in a case where the phenomenon is a new one (e.g., an infectious disease caused by an unknown virus, usage status of a new service, etc.) and there are few events that have occurred in the past. Moreover, it is difficult to prepare the prior knowledge in a case where it is assumed that the occurrence tendency of the event is different from the past (e.g., a case where a service given in a region A is deployed in another region B, a case where a new law is enforced, etc.), for example.

An embodiment of the present invention has been made in view of the above points, and an object thereof is to accurately predict the occurrence of future events.

Solution to Problem

In order to achieve the above object, according to an embodiment, a point process learning method executed by a computer includes: an input procedure of inputting a learning data set including at least first event data representing a series of occurrences of first events; a division procedure of dividing the first event data included in the learning data set by using a prediction time observation area including at least a time series when predicting future event occurrence; and a learning procedure of learning a model parameter including a parameter of an intensity function of a predetermined point process model by using a divided learning data set divided in the division procedure.

Advantageous Effects of Invention

It is possible to accurately predict the occurrence of future events.

BRIEF DESCRIPTION OF DRAWINGS

FIG. 2 is a diagram illustrating an example of a functional configuration of a point process learning apparatus at the time of learning.

FIG. 5 is a diagram illustrating an example of a functional configuration of a point process learning apparatus at the time of prediction.

DESCRIPTION OF EMBODIMENTS

Hereinafter, an embodiment of the present invention will be described. In the present embodiment, a point process learning apparatus 10 capable of accurately predicting the occurrence of future events by a point process even in a case where there is a small number of pieces of past event data and there is no prior knowledge regarding an event to be predicted will be described. Note that a learning time at which a parameter of a model (which will be hereinafter also referred to as a "prediction model") is learned and a prediction time at which the occurrence of future events is predicted from a prediction model using a learned parameter exist in the point process learning apparatus 10 according to the present embodiment.

<Hardware Configuration>

Figure 1:
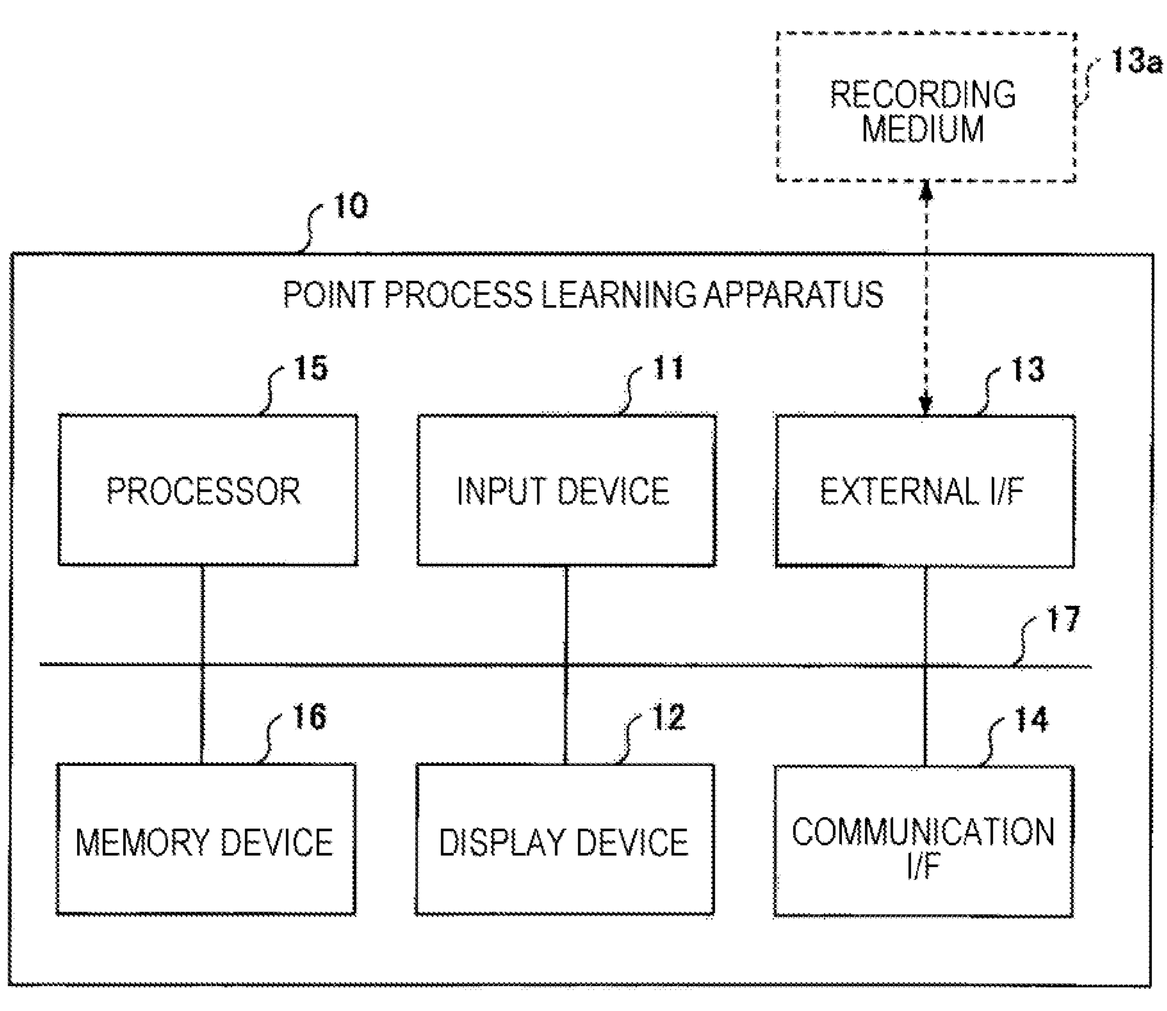
FIG. 1 is a diagram illustrating an example of a hardware configuration of a point process learning apparatus according to the present embodiment.

First, a hardware configuration of the point process learning apparatus 10 according to the present embodiment will be described with reference to FIG. 1. FIG. 1 is a diagram illustrating an example of a hardware configuration of the point process learning apparatus 10 according to the present embodiment.

As illustrated in FIG. 1, the point process learning apparatus 10 according to the present embodiment is implemented by a hardware configuration of a general computer or computer system, and has an input device 11, a display device 12, an external I/F 13, a communication I/F 14, a processor 15, and a memory device 16. These hardware devices are communicably connected via a bus 17.

The input device 11 is, for example, a keyboard, a mouse, a touch panel, or the like. The display device 12 is, for example, a display or the like. Note that the point process learning apparatus 10 may not have, for example, at least one of the input device 11 or the display device 12.

The external I/F 13 is an interface with an external device such as a recording medium 13*a*. The point process learning apparatus 10 can perform reading, writing, and the like to the recording medium 13*a* via the external I/F 13. Note that examples of the recording medium 13*a* include a compact disc (CD), a digital versatile disk (DVD), a secure digital memory card (SD memory card), a universal serial bus (USB) memory card, and the like.

The communication I/F 14 is an interface for connecting the point process learning apparatus 10 with a communication network. The processor 15 is, for example, one of various arithmetic devices such as a central processing unit (CPU) and a graphics processing unit (GPU). The memory device 16 is, for example, one of various storage devices such as a hard disk drive (HDD), a solid state drive (SSD), a random access memory (RAM), a read only memory (ROM), and a flash memory.

The point process learning apparatus 10 according to the present embodiment can implement learning processing and prediction processing to be described later by having the hardware configuration illustrated in FIG. 1. Note that the hardware configuration illustrated in FIG. 1 is an example, and the point process learning apparatus 10 may have another hardware configuration. For example, the point process learning apparatus 10 may have a plurality of processors 15 or a plurality of memory devices 16.

<Preparation>

Next, symbols and the like to be used in the present embodiment are prepared.

The data set is denoted by $D=(D_e, \{D_c\}_{c\in C})$. Here, $D_e$ is event data, and $D_c$ is auxiliary data related to the attribute $c\in C$. That is, the data set D includes the event data $D_e$ and $|C|$ pieces of auxiliary data.

The event data $D_e$ is obtained by sorting a series of events in order of occurrence thereof, and is represented as:

$$\mathcal{D}_e = \{x_n\}_{n=1}^{N} \quad \text{[Math. 1]}$$

N is the number of pieces of data (i.e., the number of occurrences of events) included in the event data, and $x_n$ represents an n-th event that has occurred. The $x_n$ is a d-dimensional real vector, that is:

$$x_n \in \mathbb{R}^d \quad \text{[Math. 2]}$$

Examples of $x_n$ and an event include:

In the case of d=1, $x_n$ is time, and the event is a behavior of a person (e.g., to walk or to eat) or the like.

In the case of d=3, $x_n$ is spatiotemporal space (time, latitude, and longitude), and the event is cluster occurrence of an infectious disease or the like.

Hereinafter, the above example is assumed as an example in the case of d=1, 3. Moreover, in the following description, an element representing time among the elements of $x_n$ is denoted by t, and the remaining elements are denoted by r.

The auxiliary data $D_c$ is data other than the event, and is represented as:

$$\mathcal{D}_c = \{(x_{cn}, a_{cn})\}_{n=1}^{N_c} \quad \text{[Math. 3]}$$

$N_c$ is the number of pieces of data included in the auxiliary data regarding the attribute $c\in C$. Moreover, $(X_{cn}, a_{cn})$ represents $X_{cn}$ and $a_{cn}$ with respect to the attribute c, and is:

$$x_{cn} \in \mathbb{R}^{d_c}$$

$$a_{cn} \in \mathbb{R}^{d_{ca}} \quad \text{[Math. 4]}$$

Here, $d_c$ (where $d_c \le d$) is the number of dimensions of $x_{cn}$, and $d_{ca}$ is the number of dimensions of $a_{cn}$.

Examples of $x_{cn}$ and $a_{cn}$ include:

In the case of d=1, it is assumed that $d_c=0$ and $d_{ca}=1$, and $a_{cn}$ is gender (e.g., the gender is represented by a categorical variable, and $a_{cn}=\{0, 1\}$) or the like.

However, $d_c=0$ is a special case, and $a_{cn}$ is associated with the entire series (i.e., all $x_n$).

In the case of d=1, it is assumed that $d_c=1$ and $d_{ca}=1$, and $x_{cn}$ is time, $a_{cn}$ is heart rate or the like.

In the case of d=3, it is assumed that $d_c=2$ and $d_{ca}$=the number of pixels, and $x_{cn}$ is latitude and longitude, and $a_{cn}$ is a pixel value (i.e., pixel value at the latitude and longitude of a satellite image, for example) or the like.

In the case of d=3, it is assumed that $d_c=3$ and $d_{ca}=1$, and $x_{cn}$ is time, and the latitude and longitude of the temperature sensor, and $a_{cn}$ is temperature or the like.

Note that, although the prediction accuracy is expected to be improved when the auxiliary data is present, the auxiliary data may not be present (this case means $C=\varphi$).

Moreover, it is assumed that the value of $x_n$ (and $x_{cn}$) is normalized or the like for each data set so as to have a common domain between data sets. For example, in the case of d=3, the time t is normalized to represent the time that has elapsed from a reference with the observation start time point of the event as the reference (t=0). Moreover, the latitude and longitude are normalized by [0, 1] (i.e., 0≤r1, r2≤1 are satisfied where the latitude is denoted by r1 and the longitude is denoted by r2, for example).

It is assumed that the following two areas are given as d-dimensional areas.

$$\text{Prediction time observation area } \mathbb{X}^o \subset \mathbb{R}^d \text{ Prediction target area } \mathbb{X}^t \subset \mathbb{R}^d \quad \text{[Math. 5]}$$

The prediction time observation area is an area where the occurrence of events is observed at the time of prediction (i.e., at the time of predicting the occurrence of future events). On the other hand, the prediction target area is a prediction target area for which the occurrence of future events is predicted. Note that an outline character is displayed as a normal character in the text of the specification. For example, the prediction time observation area is denoted by $X^o$, and the prediction target area is denoted by $X^t$.

Examples of the prediction time observation area $X^o$ and the prediction target area $X^t$ in the case of d=3 include the following.

$$X^o=\{(t,r_1,r_2)|0\le t\le 5, 0\le r_1,r_2\le 1\}$$

$$X^t=\{(t,r_1,r_2)|5<t\le 1000, 0\le r_1,r_2\le 1\}$$

<<Time of Learning>>

It is assumed that $|S|$ data sets $\{D^s\}_{s\in S}$ are given at the time of learning. Here, $$\mathcal{D}^s = (\mathcal{D}_e^s, \{\mathcal{D}_c^s\}_{c=1}^{C}) \quad \text{[Math. 6]}$$

$$\mathcal{D}_e^s = \{x_n^s\}_{n=1}^{N^s}$$

$$\mathcal{D}_c^s = \{(x_{cn}^s, a_{cn}^s)\}_{n=1}^{N_c^s}$$

Note that the data set $\{D^s\}_{s\in S}$ is also referred to as a "learning data set".

<<Time of Prediction>>

At the time of prediction, it is assumed that a data set $D^{s*}$ (where s* is an element not included in S) and a prediction target area $X^t$ are given. Here, $$\mathcal{D}^{s^*} = (\mathcal{D}_e^{s^*}, \{\mathcal{D}_c^{s^*}\}_{c \in C})$$ [Math. 7]

$$\mathcal{D}_e^{s^*} = \{x_n^{s^*}\}_{n=1}^{N^{s^*}}$$

$$\mathcal{D}_c^{s^*} = \{(x_{cn}^{s^*}, a_{cn}^{s^*})\}_{n=1}^{N_c^{s^*}}$$

However, $N^{s*}$ is a relatively small natural number (e.g., $N^{s*}=5$, $N^{s*}=10$, or the like). Note that the data set $D^{s*}$ is also referred to as a "prediction data set".

At this time, it is an object to accurately predict events $$\{x_n\}_{n=N^{s^*}+1}^{N^{a^*}+N_{X^t}}$$ [Math. 8]

that occur in the prediction target area $X^t$. Here, $$N_{\mathbb{X}^t}$$ [Math. 9]

is the number of events that occur in the prediction target area $X^t$.

Note that each of the event data $D_e^s$ is a series of occurrences of first events used for learning of the prediction model, and the event data $D_e^{s*}$ is a series of occurrences of second events to be predicted. In the present embodiment, it is assumed that the first events and the second events are different events.

<Prediction Model>

Hereinafter, the prediction model will be described. The prediction model includes the following latent vector z and the intensity function X, and the occurrence of events is predicted by a prediction method described below at the time of prediction.

<<Latent Vector>>

The latent vector z is defined below.

$$z = f_z\left(\left[f_e\left(\{x_n\}_{n=1}^N\right), \left\{f_c\left(\{x_{cn}, a_{cn}\}_{n=1}^{N_c}\right)\right\}_{c \in C}\right]\right) \in \mathbb{R}^K$$ [Math. 10]

Here, [■, ■] represents vector concatenation.

Moreover, $f_e$ is a function that outputs a $k_e$-dimensional vector with an arbitrary number of events as an input. As $f_e$, for example, a recurrent neural network (RNN), an attention model-based neural network, or the like can be used.

The $f_c$ is a function that outputs a $k_c$-dimensional vector with auxiliary data as an input. A specific function to be used as $f_c$ depends on the format of the auxiliary data. In the case of the above-described image such as a satellite image, for example, a convolutional neural network (CNN) or the like is used as $f_c$. Moreover, in the case of the series data (e.g., sensor data, etc.), for example, CNN, RNN, or the like is used as $f_c$. In addition, a fully connected layer neural network, attention model-based neural network, or the like may be used as $f_c$ according to the format of the auxiliary data.

The $f_z$ is a function that outputs a K-dimensional vector with a $(k_e+\Sigma_{c \in C}k_c)$-dimensional vector as an input. As $f_z$, for example, a fully connected layer neural network can be used.

Note that the definition of the latent vector z represented in above Formula 10 is an example, and, for example, event data may not be used, that is, $$f_e\left(\{x_n\}_{n=1}^N\right)$$ [Math. 11]

may not be used.

<<Intensity Function>>

The intensity function λ is defined below.

$$\lambda\left(x \mid \{x_n\}_{n=1}^N, \{x_{cn}, a_{cn}\}_{n=1}^{N_c}, z; \theta\right)$$ [Math. 12]

Here, θ is all the parameters in the intensity function.

Note that the definition of the intensity function X represented in above Formula 12 is an example, and, for example, auxiliary data $$\{x_{cn}, a_{cn}\}_{n=1}^{N_c}$$ [Math. 13]

may be used only partially or not used at all.

Moreover, although the intensity function λ is a function that characterizes a point process model, the present embodiment is applicable to an arbitrary point process model. As an example, a point process model and an intensity function λ that characterizes the point process model are shown below.

In the case of d=1

Extension using a neural network of the Hawkes process.

At this time, the intensity function λ is represented as follows.

$$\lambda\left(x \mid \{x_n\}_{n=1}^N, z; \theta\right) = f_b(z) + \sum_{x_i < x} g(x, x_i; z)$$ [Math. 14]

Here, $$g(x,x';z)=\exp\left(-\|f_l([x,z])-f_l([x',z])\|^2\right)$$ [Math. 15]

Moreover, $f_l$ (l is a lower case of L) is an arbitrary neural network, and $f_b$ is a neural network in which an arbitrary output has a positive scalar value.

In the case of d=3

The above spatiotemporal extension.

It is represented as x=(t, r) with t as time and r as position coordinates (e.g., latitude and longitude). At this time, the intensity function λ is represented as follows.

$$\lambda\left((t, r) \mid \{x_n\}_{n=1}^N; \theta\right) = f_b([r, z]) + \sum_{t_i < t} g_1(r, r_i; z) g_2(t, t_i; z)$$ [Math. 16]

Here, $$g_1(r,r';z)=\exp\left(-\|f_{l_1}([r,z])-f_{l_1}([r',z])\|^2\right)$$

$$g_2(t,t';z)=\exp\left(-\|f_{l_2}([t,z])-f_{l_2}([t',z])\|^2\right)$$ [Math. 17]

Moreover, $$f_{l_1}, f_{l_2}$$ [Math. 18]

is an arbitrary neural network, and $f_b$ is a neural network in which an arbitrary output has a positive scalar value.

<<Prediction Method>>

In the process of predicting the occurrence of events, the occurrence of the events may be predicted by the prediction likelihood determined from the above intensity function λ, or may be predicted by simulation using the above intensity function λ.

The prediction likelihood determined from the above intensity function X is defined below.

$$p(\{x_n|x_n\in \mathbb{X}^t\}|\{x_n|x_n\in \mathbb{X}^o\},\{\{(x_n,a_{cn})|x_{cn1}\in \mathbb{X}^o\}\}_{c\in C}) \quad \text{[Math. 19]}$$

On the other hand, as a simulation using the above intensity function λ, existing technique described in, for example, reference literature "Ogata, Y. "On Lewis 'simulation method for point processes.", IEEE Transactions on Information Theory 27(1), 2331 (1981)" or the like may be used.

<Functional Configuration at the Time of Learning>

Next, a functional configuration of the point process learning apparatus 10 at the time of learning will be described with reference to FIG. 2. FIG. 2 is a diagram illustrating an example of a functional configuration of the point process learning apparatus 10 at the time of learning.

As illustrated in FIG. 2, the point process learning apparatus 10 at the time of learning has a selection unit 101, a division unit 102, a feature extraction unit 103, an intensity function estimation unit 104, and a parameter update unit 105. Each of these units is implemented by, for example, processing executed by the processor 15 by one or more programs installed in the point process learning apparatus 10.

Moreover, the point process learning apparatus 10 at the time of learning has a storage unit 110. The storage unit 110 is implemented by, for example, the memory device 16. However, the storage unit 110 may be implemented by, for example, a storage device (e.g., a database server, etc.) connected with the point process learning apparatus 10 via a communication network.

The storage unit 110 stores a learning data set $(D^s)_{s\in S}$ for learning a parameter (which will be hereinafter referred to as a "model parameter") of the prediction model.

The selection unit 101 randomly selects one data set $D^s$ from the learning data set $\{D^s\}_{s\in S}$ stored in the storage unit 110.

The division unit 102 determines a learning observation area $X^{o\prime}$ from the prediction time observation area $X^o$, and uses the learning observation area $X^{o\prime}$ to divide the event data $D_e^s$ and the auxiliary data $\{D_c^s\}_{c\in C}$ included in the data set $D^s=\{D_e^s, \{D_c^s\}_{c\in C}\}$. At this time, the division unit 102 makes a division into three pieces of event data $D_e^{so\prime}$ and auxiliary data $\{D_c^{so\prime}\}_{c\in C}$, corresponding to the learning observation area $X^{o\prime}$, event data $D_e^{st}$ later than the learning observation area $X^{o\prime}$, and other data.

Note that a specific division method will be described later.

The feature extraction unit 103 calculates the latent vector $z^{so}$ by the above Formula 10 using the event data $D_e^{so\prime}$ and the auxiliary data $\{D_c^{so\prime}\}_{c\in C}$ corresponding to the learning observation area $X^{o\prime}$.

The intensity function estimation unit 104 calculates the intensity function λ by the above Formula 12 using the event data $D_e^{so\prime}$ and the auxiliary data $\{D_c^{so\prime}\}_{c\in C}$ corresponding to the learning observation area $X^{o\prime}$ and the latent vector $z^{so}$.

The parameter update unit 105 updates the model parameters (i.e., the parameters of the neural network such as $f_e$, $f_c$, and $f_z$, and the parameter θ of the intensity function λ) so as to minimize an error from the event data Dest later than the learning observation area $X^{o\prime}$. At this time, when the prediction likelihood is used, the negative log likelihood of $p(D_e^{st}|D_e^{so\prime}, \{D_c^{so\prime}\}_{c\in C})$ may be minimized. Note that the prediction likelihood may be $p(D_e^{st}, D_e^{so\prime}|D_e^{so\prime}, \{D_c^{so\prime}\}_{c\in C})$ (that is, $D_e^{so\prime}$ may be used at the time of calculating the likelihood). On the other hand, in the case of prediction by simulation, an error between the result and $D_e^{st}$ may be minimized.

<Learning Processing>

Figure 3:
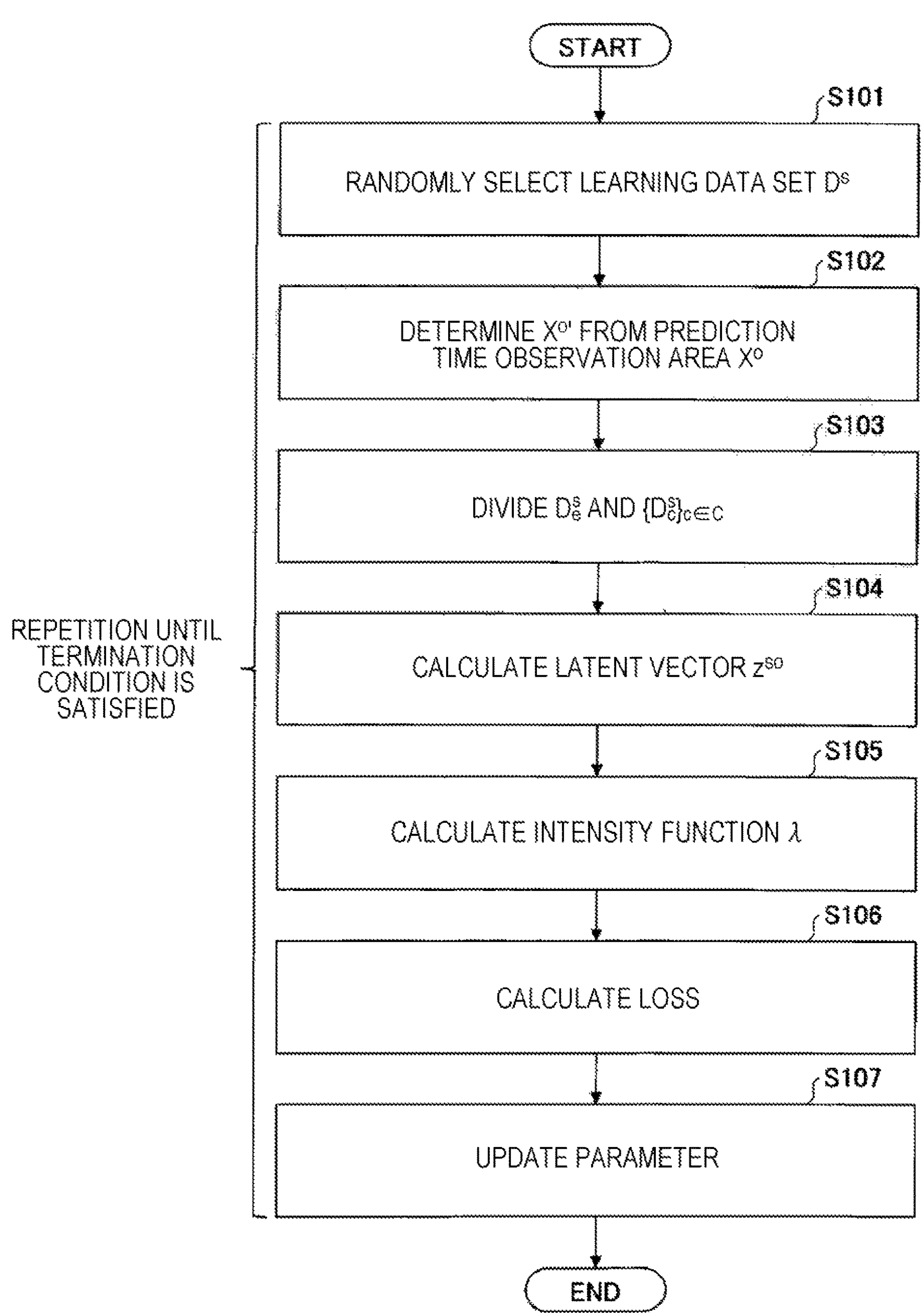
FIG. 3 is a flowchart illustrating an example of learning processing according to the present embodiment.

Next, the learning processing according to the present embodiment will be described with reference to FIG. 3. FIG. 3 is a flowchart illustrating an example of the learning processing according to the present embodiment. Note that the following steps S101 to S107 are repeatedly executed until a predetermined termination condition is satisfied. Examples of such a termination condition include that the number of repetitions has reached a predetermined number of times, that the value of the model parameter has converged (e.g., that the update amount of the model parameter becomes less than the predetermined threshold before and after the repetition), and the like.

First, the selection unit 101 randomly selects one data set $D^s$ from the learning data set $\{D^s\}_{s\in S}$ stored in the storage unit 110 (step S101).

Next, the division unit 102 determines a learning observation area $X^{o\prime}$ from the prediction time observation area $X^{o\prime}$ (step S102). Here, the learning observation area $X^{o\prime}$ is determined by the following determination method with reference to the prediction time observation area $X^o$.

The learning observation area $X^{o\prime}$ has the same size as the size of the prediction time observation area $X^o$ (however, for example, only the time direction may be lengthened or conversely shortened).

A start point of time of the learning observation area $X^{o\prime}$ is randomly determined (however, for example, the determination may be made on the basis of a certain rule such as adding 1 to the start point of time for each repetition after the initial value of the start point of time is set).

As an example, an example of the learning observation area $X^{o\prime}$ in a case where $X^o=\{(t, r_1, r_2)|0\le t\le 5, 0\le r_1, r_2\le 1\}$ is satisfied will be described below.

$$X^{o\prime}=\{(t,r_1,r_2)|3\le t\le 8,0\le r_1,r_2\le 1\}$$

$$X^{o\prime}=\{(t,r_1,r_2)|4\le t\le 9,0\le r_1,r_2\le 1\}$$

$$X^{o\prime}=\{(t,r_1,r_2)|5\le t\le 10,0\le r_1,r_2\le 1\}$$

Figure 4:
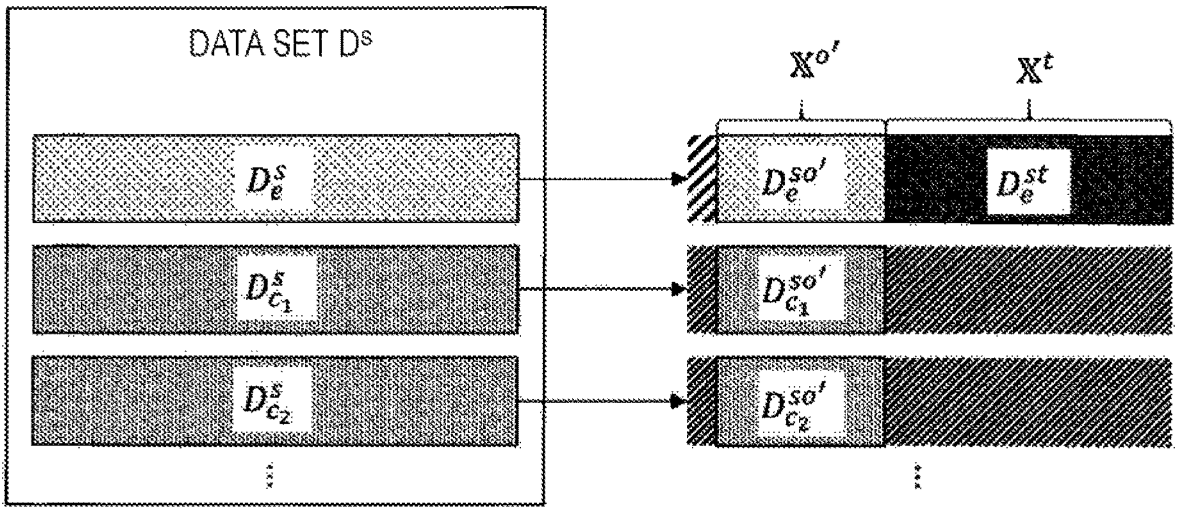
FIG. 4 is a diagram for explaining an example of data division.

Next, the division unit 102 divides the event data $D_e^s$ and the auxiliary data $\{D_c^s\}_{c\in C}$ included in the data set $D^s=\{D_e^s, \{D_c^s\}_{c\in C}\}$ using the learning observation area $X^{o\prime}$(step S103). That is, the division unit 102 divides the event data $D_e^s$ into three pieces of event data $D_e^{so\prime}$ corresponding to the learning observation area $X^{o\prime}$, event data $D_e^{st}$ later than the learning observation area $X^{o\prime}$, and other data. Similarly, the division unit 102 divides the auxiliary data $\{D_c^s\}_{c\in C}$ into three pieces of auxiliary data $\{D_c^{so\prime}\}_{c\in C}$: corresponding to the learning observation area $X^{o\prime}$ and other data. There are three pieces of data used in the processing described later: $D_e^{so\prime}$, $D_e^{st}$, and $\{D_c^{so\prime}\}_{c\in C}$, and no other data is used. FIG. 4 schematically illustrates this. In FIG. 4, an area later than $X^{o\prime}$ is denoted by $X^t$, and event data $D_e^{st}$ corresponding to this area $X^t$ is used as so-called teacher data (or correct answer data). Note that hatched portions are data that are not used. Moreover, $c_1$ and $c_2$ are elements of C.

Next, the feature extraction unit 103 calculates the latent vector $z^{so}$ by the above Formula 10 using the event data $D_e^{so\prime}$ and the auxiliary data $\{D_c^{so\prime}\}_{c\in C}$ corresponding to the learning observation area $X^{o\prime}$(step S104). That is, the feature extraction unit 103 calculates the latent vector $z^{so}$ by the following formula.

$$z^{so}=f_z([f_e(D_e^{so\prime}),\{f_c(D_c^{so\prime})\}_{c\in C}])$$

Note that, as described above, the latent vector $z^{so}$ may be calculated without using the event data $D_e^{so\prime}$ in a case where auxiliary data is given, or the latent vector $z^{so}$ may be calculated only using the event data $D_e^{so'}$ in a case where no auxiliary data is given.

Next, the intensity function estimation unit 104 calculates the intensity function λ by the above Formula 12 using the event data $D_e^{so'}$ and the auxiliary data $\{D_c^{so'}\}_{c\in C}$ corresponding to the learning observation area $X^{o'}$ and the latent vector $z^{so}$ (step S105). That is, the intensity function estimation unit 104 calculates $\lambda(x|D_e^{so'}, \{D_c^{so'}\}_{c\Sigma C}, z^{so})$. Note that, as described above, the auxiliary data $\{D_c^{so'}\}_{c\in C}$ may be used only partially or not used at all.

Next, the parameter update unit 105 calculates an error from event data $D_e^{st}$ later than the learning observation area $X^{o'}$ (step S106). Note that, as described above, the negative log likelihood of the prediction likelihood $p(D_e^{st}|D_e^{so'}, \{D_c^{so'}\}_{c\in C})$ may be used as the error, or the error between the simulation result and $D_e^{st}$ may be used as the error.

Then, the parameter update unit 105 updates the model parameter so as to minimize the error calculated in the above step S106 using, for example, the gradient method (step S107).

As described above, the point process learning apparatus 10 according to the present embodiment can learn the parameters (i.e., the parameters of the neural network such as $f_e$, $f_c$, and $f_z$, and the parameter θ of the intensity function λ) of the prediction model. At this time, as described in the above steps S102 to S103, the point process learning apparatus 10 according to the present embodiment divides the data set $D^s$ using the learning observation area $X^{o'}$ determined from the prediction time observation area $X^o$, and then calculates the intensity function, the prediction likelihood, and the like using the divided data set. As a result, it is possible to accurately predict the occurrence of future events even if the number of pieces of event data given at the time of prediction is small.

<Functional Configuration at the Time of Prediction>

Next, a functional configuration of the point process learning apparatus 10 at the time of prediction will be described with reference to FIG. 5. FIG. 5 is a diagram illustrating an example of a functional configuration of the point process learning apparatus 10 at the time of prediction.

As illustrated in FIG. 5, the point process learning apparatus 10 at the time of prediction has the feature extraction unit 103, the intensity function estimation unit 104, and a prediction unit 106. Each of these units is implemented by, for example, processing executed by the processor 15 by one or more programs installed in the point process learning apparatus 10.

Moreover, the point process learning apparatus 10 at the time of prediction has the storage unit 110. The storage unit 110 is implemented by, for example, the memory device 16. However, the storage unit 110 may be implemented by, for example, a storage device (e.g., a database server, etc.) connected with the point process learning apparatus 10 via a communication network.

The storage unit 110 stores a prediction data set $D^{s*}$ for predicting events that occur in the prediction target area $X^t$.

The feature extraction unit 103 calculates the latent vector $z^{s*}$ by the above Formula 10 using the event data $D_e^{s*}$ and the auxiliary data $(D_c^{s*})_{c\in C}$ included in the prediction data set $D^{s*}$. However, used are parameters of the neural network such as $f_e$, $f_c$, and $f_z$ that have already been learned.

The intensity function estimation unit 104 uses the event data $D_e^{s*}$ and the auxiliary data $\{D_c^{s*}\}$ ee included in the prediction data set $D^{s*}$ and the latent vector $z^{s*}$ to calculate the intensity function λ by the above Formula 12. However, used is the learned parameter θ of the intensity function λ that has already been learned.

The prediction unit 106 predicts events that occur in the prediction target area $X^t$ by the intensity function λ.

<Prediction Processing>

Figure 6:
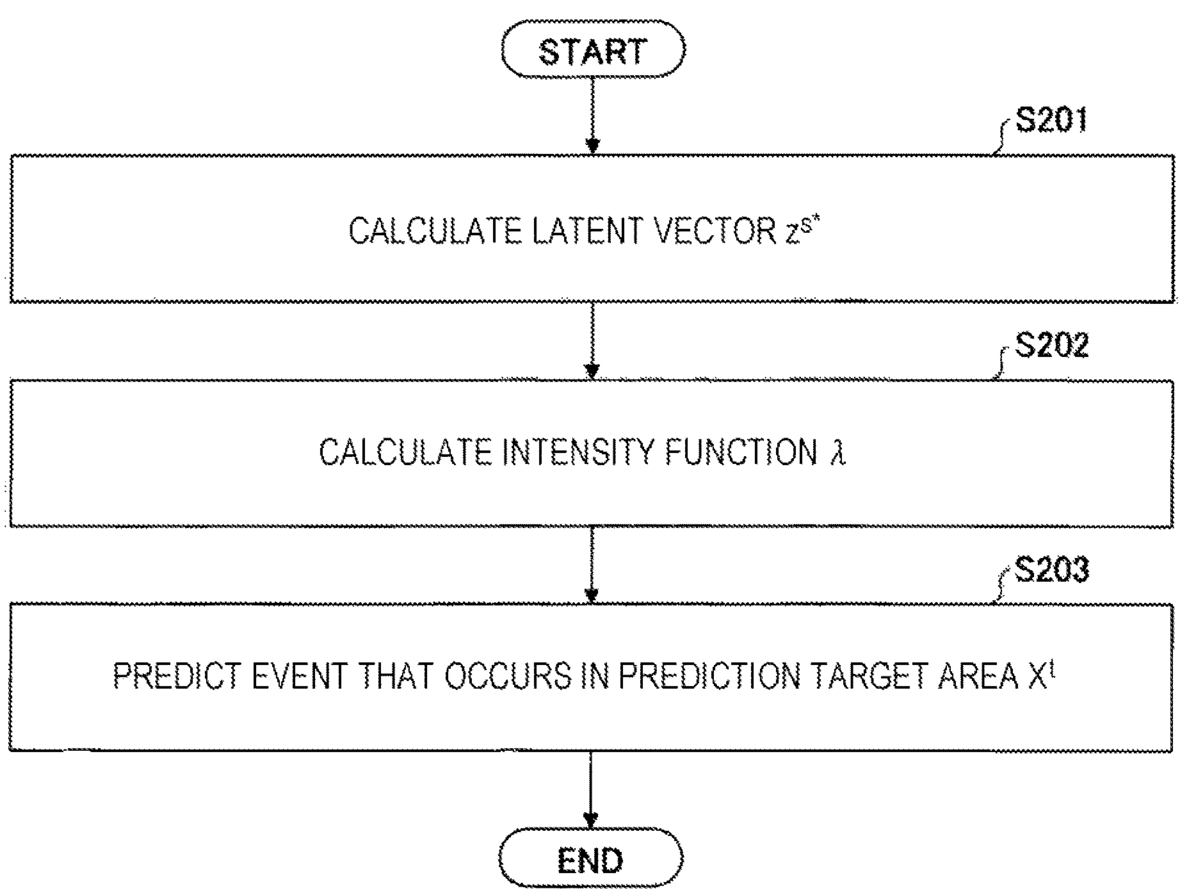
FIG. 6 is a flowchart illustrating an example of prediction processing according to the present embodiment.

Next, prediction processing according to the present embodiment will be described with reference to FIG. 6. FIG. 6 is a flowchart illustrating an example of prediction processing according to the present embodiment.

First, the latent vector $z^{s*}$ is calculated by the above Formula 10 using the event data $D_e^{s*}$ and the auxiliary data $\{D_c^{s*}\})_{c\in C}$ included in the prediction data set $D^{s*}$ (step S201). That is, the feature extraction unit 103 calculates the latent vector $z^{s*}$ by the following formula.

$$z^{s*}=f_z([f_e(D_e^{s*}),\{f_c(D_c^{s*})\}_{c\in C}])$$

Note that, as described above, the latent vector $z^{s*}$ may be calculated without using the event data $D_e^{s*}$ in a case where auxiliary data is given, or the latent vector $z^{s*}$ may be calculated only using the event data $D_e^{s*}$ in a case where no auxiliary data is given.

Next, the intensity function estimation unit 104 uses the event data $D_e^{s*}$ and the auxiliary data $\{D_c^{s*}\}_{c\in C}$ included in the prediction data set $D^{s*}$ and the latent vector $z^{s*}$ to calculate the intensity function λ by the above Formula 12 (step S202). That is, the intensity function estimation unit 104 calculates $\lambda(x|D_e^{s*}, \{D_c^{s*}\}_{c\in C}, z^{s*})$. Note that, as described above, the auxiliary data $\{D_c^{s*}\}_{c\in C}$ may be used only partially or not used at all.

Then, the prediction unit 106 predicts events that occur in the prediction target area $X^t$ by the intensity function $\lambda(x|D_e^{s*}, \{D_c s^*\}_{c\in C}, z^{s*})$ (step S203).

As described above, the point process learning apparatus 10 according to the present embodiment can predict events that occur in the prediction target area $X^t$ using the prediction data set $D^{s*}$ including a relatively small number of pieces of data.

<Comparative Example with Conventional Technique>

Figure 7:
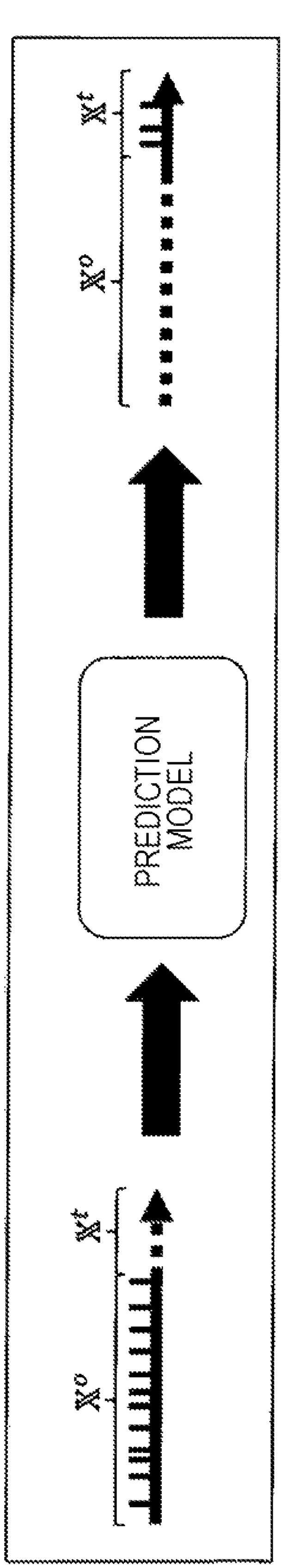
FIG. 7 is a diagram illustrating a comparative example with conventional technique.

FIG. 7 illustrates a comparative example of the point process learning apparatus 10 (proposed technique) according to the present embodiment and conventional technique. As illustrated in FIG. 7, a relatively large area is required as the prediction time observation area $X^o$ in order to accurately predict events that occur in the prediction target area $X^t$ in conventional technique, whereas the point process learning apparatus 10 according to the present embodiment can accurately predict events in a relatively small area as the prediction time observation area $X^o$. Therefore, it becomes possible with the point process learning apparatus 10 according to the present embodiment to accurately predict the occurrence of future events even in a case where only a relatively small number of pieces of event data can be observed (e.g., in a case where it is assumed that the occurrence tendency of a new phenomenon or event is different from the past, or the like).

<Extension to Marked Point Process>

The embodiment described above can be easily extended to an arbitrary marked point process. In the marked point process, the event data $D_e$ is given below.

$$\mathcal{D}_e = \{(x_n, y_n)\}_{n=1}^N \quad \text{[Math. 20]}$$

Note that $y_n$ may be any of discrete, continuous, and dimensional.

By replacing the event data $D_e$ in the embodiment described above with the event data $D_e$ represented in the above Formula 20, an arbitrary marked point process is extended.

EXAMPLES

As an example of the above embodiment, an example of data of a case where events to be predicted are set as "the occurrence of infected people of new infectious disease B* in region A* occurring in the next half year" is shown below. At this time, the event data $D_e=\{x_n\}$ is $x_n$=(time, latitude, longitude).

Example of learning data set: Series of occurrences events of infected people with other infectious diseases $B_1, \ldots, B_{N'}$, in other regions $A_1, \ldots, A_{N'}$ (e.g., each in one year or the like)

Example of auxiliary data: Real-time demographic data, map data showing public transportation, and climate information (e.g., the highest temperature, the lowest temperature, the humidity, and the like in the region) data Example of a mark when applied to marked point process: Gender, age, and occupation of infected person Example of prediction data set: Series of occurrences of events for the past one week of infected people with new infectious disease B* in region A*, and above-described auxiliary data for the same period or independent of time (e.g., real-time demographic data and climate information as auxiliary data for the same period as the series of the occurrences of the events, map data indicating public transportation as auxiliary data independent of time, etc.)

The present invention is not limited to the above embodiment specifically disclosed, and various modifications and changes, combinations with known technique, and the like can be made without departing from the scope of the claims.

REFERENCE SIGNS LIST

10 point process learning apparatus
11 input device
12 display device
13 external I/F
**13*a*** recording medium
14 communication I/F
15 processor
16 memory device
17 bus
101 selection unit
102 division unit
103 feature extraction unit
104 intensity function estimation unit
105 parameter update unit
106 prediction unit
110 storage unit

The invention claimed is:

1. A point process learning method executed by a computer, the point process learning method comprising:

inputting a learning data set including at least first event data representing a series of occurrences of first events and auxiliary data representing environment information or attribute information associated with the first events;

dividing the first event data included in the learning data set by using a prediction time observation area including at least a time series when predicting future event occurrence to obtain a divided learning data set, said dividing being performed by (i) randomly determining a start point of time for a learning observation area; and (ii) simulating a low-data prediction environment by extracting a first data group of a specific time scale from the learning data set, thereby adapting the learning process to specific time-scale constraints at a time of prediction by matching a time scale of the learning observation area with a time scale of the prediction time observation area;

transforming, by a neural network, the extracted first data group and the auxiliary data into a latent vector that represents a compressed spatiotemporal feature of the events, thereby integrating heterogeneous data sources while optimizing a computational load of the point process model through reduction of data dimensionality;

parameterizing an intensity function of a point process model specifically as a joint function of the latent vector and a continuous-time state of the point process; and learning a model parameter including a parameter of the intensity function of a predetermined point process model by using the divided learning data set, thereby updating the model parameter to minimize a prediction error relative to teacher data.

2. The point process learning method according to claim 1, further comprising:

inputting a prediction data set including at least second event data representing a series of occurrences of second events to be predicted, and predicting a series of occurrences of second events in a prediction target area that is an area later than the prediction time observation area by the point process model by using the prediction data set and the learned model parameter.

3. The point process learning method according to claim 2, wherein the learning data set and the prediction data set include one or more pieces of auxiliary data that is auxiliary information other than an event occurrence series.

4. The point process learning method according to claim 2, wherein a mark for each of the first events and the second events is added to the first event data and the second event data.

5. The point process learning method according to claim 1, wherein the point process model includes a function implemented by one or more neural networks and the intensity function, and the learning includes learning model parameters including a parameter of the neural network and a parameter of the intensity function.

6. The point process learning method according to claim 1, wherein the dividing of the first event data includes:

creating a learning observation area in which a time series included in the prediction time observation area is changed; and dividing the first event data included in the learning data set into a first data group corresponding to the learning observation area, a second data group corresponding to a time series later than the time series included in the learning observation area, and a remaining data group.

7. A point process learning apparatus comprising:

a memory; and a processor coupled to the memory and configured to input a learning data set including at least first event data representing a series of occurrences of first events and auxiliary data representing environment information or attribute information associated with the first events;

divide the first event data included in the learning data set by using a prediction time observation area including at least a time series when predicting future event occurrence to obtain a divided learning data set, said first event data being divided by (i) randomly determining a start point of time for a learning observation area; and (ii) simulating a low-data prediction environment by extracting a first data group of a specific time scale from the learning data set, thereby adapting the learning process to specific time-scale constraints at a time of prediction by matching a time scale of the learning observation area with a time scale of the prediction time observation area;

transform, by a neural network, the extracted first data group and the auxiliary data into a latent vector that represents a compressed spatiotemporal feature of the events, thereby integrating heterogeneous data sources while optimizing a computational load of the point process model through reduction of data dimensionality;

parameterize an intensity function of a point process model specifically as a joint function of the latent vector and a continuous-time state of the point process; and learn a model parameter including a parameter of the intensity function of a predetermined point process model by using the divided learning data set, thereby updating the model parameter to minimize a prediction error relative to teacher data.

8. A non-transitory computer-readable recording medium storing a program for causing a computer to execute the point process learning method according to claim 1.

9. The point process learning method according to claim 1, further comprising:

repeatedly executing the learning procedure until a predetermined termination condition is satisfied, wherein the predetermined termination condition includes that a value of the model parameter has converged; and controlling, by the processor, the repetition of the learning procedure to minimize a computational update amount of the model parameter before and after each repetition, thereby optimizing a computational resource of the computer required to reach the converged value of the model parameter.

10. The point process learning method according to claim 1, further comprising:

normalizing, by the processor, a value of the first event data and a value of the auxiliary data to have a common domain across different data sets prior to the transforming into the latent vector, wherein the normalizing includes representing a time element of the first events as an elapsed time from a reference observation start time point and representing latitude and longitude elements of the first events as values within a range of [0, 1] to reduce a computational bias of the neural network.

11. The point process learning method according to claim 1, wherein the joint function of the intensity function is defined as an extension of a Hawkes process comprising:

(i) a first neural network that generates a positive scalar background intensity based on the latent vector; and (ii) a second neural network that calculates a triggering effect between past events and a future event time based on the latent vector, thereby enabling the computer to model non-linear self-exciting or inhibiting dynamics that are not captured by a standard additive Hawkes process.

* * * * *